US 6,950,766 B2

(12) United States Patent
Okamoto et al.

(10) Patent No.: US 6,950,766 B2
(45) Date of Patent: Sep. 27, 2005

(54) PLANT MONITORING APPARATUS AND STORAGE MEDIUM

(75) Inventors: Masami Okamoto, Chofu (JP); Shigeru Shirai, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 175 days.

(21) Appl. No.: 10/297,805

(22) PCT Filed: Jun. 13, 2001

(86) PCT No.: PCT/JP01/04985
§ 371 (c)(1),
(2), (4) Date: Dec. 10, 2002

(87) PCT Pub. No.: WO01/96970
PCT Pub. Date: Dec. 20, 2001

(65) Prior Publication Data
US 2004/0098911 A1 May 27, 2004

(51) Int. Cl.[7] .......................... G06F 19/00; G06F 11/30
(52) U.S. Cl. ......................... 702/81; 702/83; 702/84; 702/182; 702/186; 702/188
(58) Field of Search .............................. 702/81, 83, 84, 702/182, 185, 186–188; 700/97, 103, 121

(56) References Cited

U.S. PATENT DOCUMENTS 5,311,562 A * 5/1994 Palusamy et al. ........... 376/215

6,571,273 B1 * 5/2003 Shirai et al. ................. 709/201

FOREIGN PATENT DOCUMENTS

| JP | 06-242807 | 9/1994 |
| JP | 07-035655 | 2/1995 |
| JP | 07-098605 | 4/1995 |
| JP | 8-249052 | 9/1996 |
| JP | 08-249052 | 9/1996 |
| JP | 09-054615 | 2/1997 |
| JP | 11-053405 | 2/1999 |
| JP | 11-296222 | 10/1999 |
| JP | 2000-339022 | 12/2000 |
| JP | 2001-084023 | 3/2001 |

OTHER PUBLICATIONS

English–language version of International Preliminary Examination Report for PCT/JP01/04985.

* cited by examiner

Primary Examiner—Bryan Bui
(74) Attorney, Agent, or Firm—Finnegan, Henderson, Farabow, Garrett & Dunner, L.L.P.

(57) ABSTRACT

A plant monitoring apparatus and a storage medium which allow engineering efficiency and data reliability to be improved are provided. There are disposed TAG databases 11a and 11b which store, according to an identifier, fixed parameters which are shared by a monitoring device 2 and a controlling device 3 composing the plant monitoring apparatus 1 and which are correlated with each input point. A distributing means 8 distributes fixed parameters edited by a database editing means 7 to both the monitoring device 2 and the controlling device 3 at a time.

8 Claims, 14 Drawing Sheets

FIG. 3

EDIT TAG  #n

COMMON PARAMETERS

VALID RANGE  100.0
VALID RANGE  500.0
ALARM PRESENCE/ABSENCE  PRESENCE
LIMIT VALUE  400.0

PARAMETERS FOR DEVICE FOR MONITORING

DISPLAY RANGE  100.0
DISPLAY RANGE  100.0

PARAMETERS FOR DEVICE FOR INPUT/OUTPUT

CONVERSION FORMULA  AX+B
CONVERSION A  2.5
CONVERSION B  0.0

DESTINATION OF DISTRIBUTION

ALL SYSTEM ☑
MONITORING DEVICE ☐
INPUT/OUTPUT DEVICE ☐

PLANT MONITORING APPARATUS AND STORAGE MEDIUM

FIELD OF THE INVENTION

The present invention relates to a plant monitoring apparatus and a storage medium, in particular, to those suitable for transmitting and receiving process information through a network.

DESCRIPTION OF THE RELATED ART

As plants become large and complicated, the number of input and output points of conventional plant monitoring apparatuses amounts to several ten thousands. Data of point information of several ten thousands is manually and centrally managed. In addition, as plants become large and complicated, the roles of each functional device are complicated and tangled. Consequently, an engineering operation which integrates those functional devices and accomplishes a monitoring function for a plant is becoming complicated.

For example, although there is fixed information shared by a monitoring device and a controlling device which compose a plant monitoring apparatus, a database is created by manually linking those common items.

In the controlling device, a point state (normal or abnormal) as an element of input point data and a process value are discretely handled and asynchronously processed. Thus, when these data are handled in the monitoring apparatus, a point state and a process value are received from the controlling device through a network. A point state and a process value for each input point are collected in the monitoring device.

When data of all points of a plant is distributed to the monitoring device at a predetermined transmission interval, as the scale of the plant becomes large, the amount of transmission data tends to increase. To reduce the load imposed on the network, the transmission interval is prolonged.

However, when fixed information shared by the monitoring device and the controlling device, which compose the plant monitoring apparatus, is manually linked and a database for the fixed information is created, if the shared data is changed, the database should be edited for each of the monitoring device and the controlling device. Thus, if the plant monitoring apparatus is composed of many devices, databases which have the same content should be changed many times. Thus, it is troublesome. In addition, if different parameters are mistakenly input instead of same parameters, the reliability of the monitoring work could be lost.

When a point state and a process value, which are separately handled in the controlling device, are received through the network and the point state and the process value are collected by the monitoring device, depending on a sampling timing and a point state change, data may be temporarily inconsistent. Consequently, data of the controlling device might conflict with data of the monitoring device. As a result, the monitoring operation might be adversely affected.

To reduce the load imposed on the network during data transmission, if the transmission interval is prolonged, the real-time property of the monitoring operation will be adversely deteriorated.

In addition, if a defect takes place on a transmission path such as a network, an event notification is not distributed to the monitoring device. As a result, the plant monitoring apparatus might not recognize occurrence of the defect.

SUMMARY OF THE INVENTION

Therefore, an object of the present invention is to provide a plant monitoring apparatus and a storage medium which allow the reliability of data to be improved.

To solve the forgoing problem, claim 1 of the present invention is a plant monitoring apparatus comprising a common parameter setting means for setting a common parameter shared by a plurality of devices, and a distributing means for distributing the common parameter to the plurality of devices.

Thus, a common parameter used in a plurality of devices can be changed by one edit operation. Since it is not necessary to repeatedly change a common parameter for each device, the engineering efficiency of the plant can be improved. In addition, a common parameter can be prevented from being inconsistent in each device due to an input mistake. As a result, the reliability of the monitoring operation can be improved.

It is preferred for the apparatus to further comprise a TAG database for each of the devices configured to store the common parameter; and a device database for each of the devices configured to store a parameter individual for each of the devices.

Thus, a common parameter can be set to a plurality of devices by one distributing process. In addition, an independent process can be also performed for each device.

Claim 3 of the present invention is a plant monitoring apparatus comprising a process information grouping means for grouping the process information according to an identifier unit, and a transmitting means for transmitting the grouped process information at a time.

Thus, the side to which process information is distributed does not need to perform an operation for correlating the process information separately transmitted. In addition, process information distributed to a plurality of locations can be uniformly correlated. Thus, since the consistency of data between for example the controlling device and the monitoring device is improved, the reliability of the monitoring operation is also improved.

It is preferred for the apparatus to further comprise a means for causing the process information to be consistent according to an identifier unit.

Thus, while a plurality of pieces of data handled between the side that distributes information and the side to which information is distributed is consistent, processes can be distributively monitored through the network.

It is preferred for the apparatus to further comprise a state change detecting means for detecting a state change of the plant according to an identifier unit. It is preferred for the transmitting means to transmit current process information only when a state change of the plant has been detected.

Thus, when the plant state does not change, data is not transmitted. Thus, when the plant scale becomes large and the amount of transmission data increases, the load imposed on the network can be reduced without a deterioration of real-time property of the monitoring operation.

It is preferred for the state change detecting means to comprise a change amount detecting means for detecting a change amount of a plant value according to an identifier unit. It is preferred for the transmitting means to transmit current process information only when the change amount exceeds a specified value.

Thus, even when a change of a plant value that is caused by a measurement error or the like, has occurred, data is not transmitted. As a result, the load imposed on the network can be further reduced without a deterioration of the monitoring function.

It is preferred for the apparatus to further comprise a counting means for counting transmissions of event notification according to an identifier unit. It is preferred for the transmitting means to add the transmission count to the event notification and transmit the event notification with the transmission count.

Thus, a lost event notification can be detected on the side to which information is distributed. When data cannot be transmitted to the side to which information is distributed, it can recognize occurrence of a defect.

It is preferred for the apparatus to further comprise a receiving means for receiving an event notification to which the transmission count has been added and determining means for determining a reception state of the event notification, based on a result from comparing between the transmission count of the event notification and a reception count of the event notification.

Thus, when the transmission count of the event notification does not match the reception count of the event notification, a lost event notification can be detected on the side to which information is distributed. Consequently, even if a low reliability transmission path is used, the reliability of data transmission can be improved without a sacrifice of high speed data transmission.

It is preferred for the apparatus to further comprise a retransmission requesting means for requesting the retransmission of the event notification according to the reception state.

Thus, when an event notification has been lost, the event notification can be securely received later. As a result, the monitoring function on the side to which information is distributed can be prevented from deteriorating.

In addition, the present invention is a computer readable storage medium on which a program has been stored, the program causing the computer to execute the steps of linking a process value with meaning information indicating a meaning of the process value, and transmitting the process value and the meaning information at a time.

Thus, not only a process value is received as a numeric value, but also the meaning of the process value can be received. Consequently, the side to which information is distributed can know what the process value represents. As a result, the monitoring performance of the plant state can be improved.

BRIEF DESCRIPTION OF DRAWINGS

FIG. 2 is a schematic diagram showing an example of the structure of a device database.

FIG. 3 is a schematic diagram showing an example of a database edit screen according to the first embodiment of the present invention.

DESCRIPTION OF THE PREFERRED EMBODIMENTS

Figure 1:
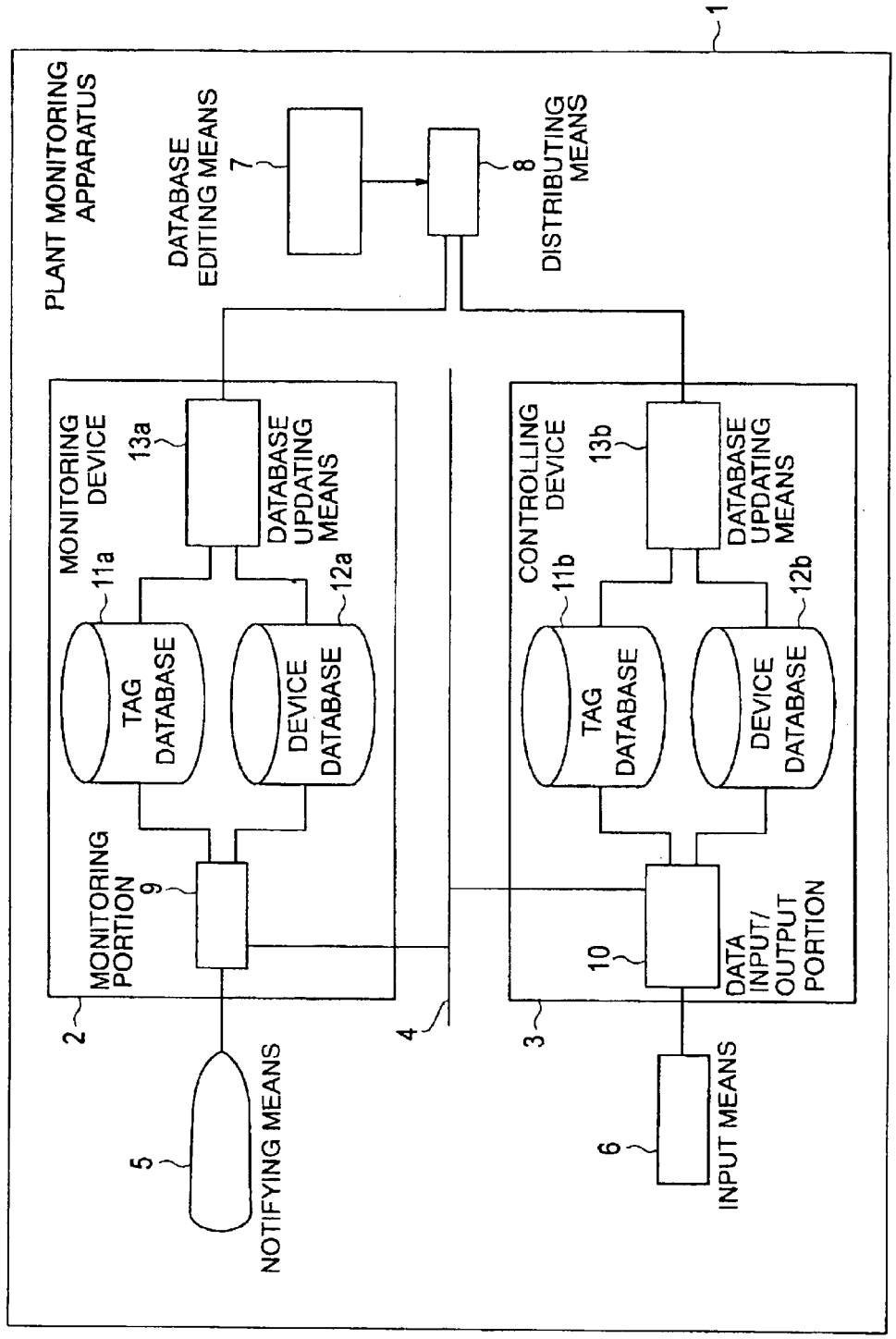
FIG. 1 is a block diagram showing the structure of a plant monitoring apparatus according to a first embodiment of the present invention.

Next, a plant monitoring apparatus according to an embodiment of the present invention will be explained with reference to the accompanying drawings. FIG. 1 is a block diagram showing the structure of a plant monitoring apparatus according to a first embodiment of the present invention.

Referring to FIG. 1, a plant monitoring apparatus 1 that monitors a plant comprises a monitoring device 2 and a controlling device 3, mainly. The monitoring device 2 has a man-machine interface function with which the user interactively operates the plant. The controlling device 3 exchanges data with the plant. The plant monitoring apparatus 1 further comprises a network 4, a notifying means 5, an input/output means 6, a database editing means 7, and a distributing means 8. The network 4 connects the monitoring device 2 with the controlling device 3. The notifying means 5 notifies the operator of an alarm. The input/output means 6 inputs and outputs data to and from the plant. The database editing means 7 edits a database. The distributing means 8 distributes an obtained result from editing the database to the monitoring device 2 and the controlling device 3.

In addition, the monitoring device 2 is provided with a monitoring portion 9. The monitoring portion 9 monitors the plant based on plant information that is sent from the controlling device 3. The controlling device 3 is provided with a data input/output portion 10 which transmits data retrieved from the plant to the monitoring device 2 through the network 4. The monitoring device 2 and the controlling device 3 are provided with TAG databases 11a and 11b, device databases 12a and 12b, and database updating means 13a and 13b, respectively. The TAG databases 11a and 11b store fixed parameters of each input point which are shared by the monitoring device 2 and controlling device 3 according to each TAGID as an unit, respectively. The device databases 12a and 12b store, using each TAGID as a key, device information that is dedicated for each device, respectively. The database updating means 13a and 13b update contents of the TAG databases 11a and 11b and contents of the device databases 12a and 12b, respectively.

Figure 2A:
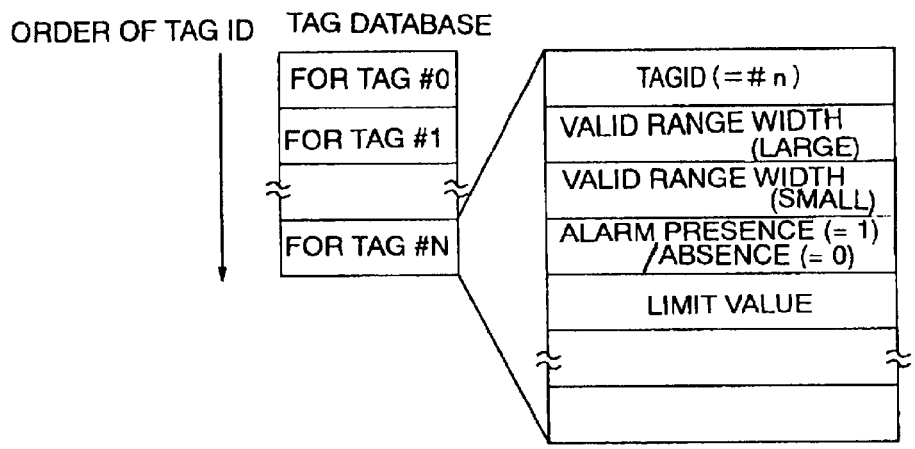
FIG. 2 is a schematic diagram showing an example of the structure of a TAG database.

FIG. 2A is a schematic diagram showing an example of the structure of the TAG databases 11a and 11b. In the TAG databases 11a and 11b there is set parameters that are shared in the plant monitoring apparatus 1 according to each TAGID as an unit. Namely, in the TAG databases 11a and 11b there can be set information and so forth that should be totally managed in the system. For example, a valid range width of a process value, the presence or absence of an alarm process, an indispensable limit value in the case that the alarm process is present, and so forth can be set according to each TAGID as an unit. The limit value may have steps. The limit value may have an upper limit and/or a lower limit. Each TAGID may be determined by the operator. Alternatively, each TAGID may be prepared by the system.

Figure 2B:
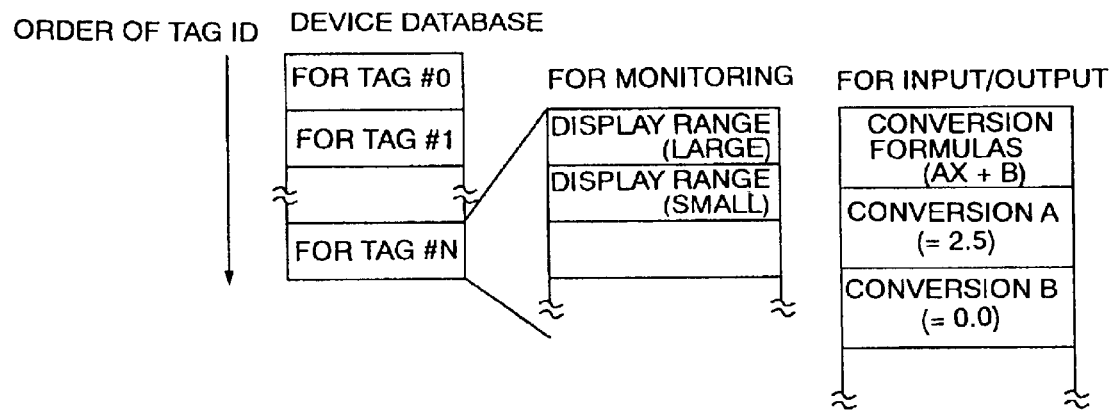

FIG. 2B is a schematic diagram showing an example of the structure of the device databases 12a and 12b. As shown in FIG. 2B, parameters which are dedicated for the monitoring device 2 and the controlling device 3 are respectively set to the device databases 12a and 12b, using each TAGID as a key. For example, a display range of a bar chart of process values displayed on a displaying device of the notifying means 5 can be set to the device database 12a of the monitoring device 2.

A display range used on the displaying device is required for the monitoring device 2, but not for the controlling device 3, which inputs and outputs data. Thus, a display range and so forth used for the displaying device are set to only the device database 12a. Information that is not necessary for the controlling device 3 is not set the device database 12b. As a result, the storage capacity of the device database 12b can be reduced.

On the other hand, information peculiar to inputting and outputting data, for example conversion information necessary for converting a voltage value and a count value which are input from a sensor of each portion of the plant can be set to the device database 12b of the controlling device 3. The conversion information used in the controlling device 3 is necessary for the controlling device 3, but not for the monitoring device 2, which is a human interface with the operator. Thus, the conversion information and so forth used in the controlling device 3 are set to only the device database 12b. Information that is not necessary for the monitoring device 2 is not set to the device database 12a. As a result, the storage capacity of the device database 12a can be reduced.

To update the contents of the TAG databases 11a and 11b and the contents of the device databases 12a and 12b in the plant monitoring apparatus 1 shown in FIG. 1, the operator interactively operates the database editing means 7 so as to evoke the database edit screen.

FIG. 3 is a schematic diagram showing an example of a database edit screen according to the first embodiment of the present invention. On the database edit screen, parameters that can be set according to the distinction between common information and device information are displayed regarding each TAG. For example, to edit parameters regarding TAGID #n, the operator selects TAGID #n on the database edit screen of the database editing means 7. Then, set items of common parameters, set items of parameters of the monitoring device, and set items of parameters of the input/output device regarding TAGID #n are displayed. When these set items are displayed, the operator edits them.

After the operator has edited the set items, the edited parameters are distributed to each target devices automatically or by the request of the operator.

After the operator has edited the common parameters, for example, when he or she designates 'All System' as the destination of distribution, the distributing means 8 distributes the edited common parameters to both the monitoring device 2 and the controlling device 3. When the common parameters have been distributed, the database updating means 13a and 13b store the contents of the distributed common parameters to the TAG databases 11a and 11b, respectively.

After the operator has edited the parameters for the monitoring device, when he or she designates 'Monitoring Device' as the destination of distribution, the distributing means 8 distributes the edited parameters for the monitoring device to the monitoring device 2. After the parameters for the monitoring device have been distributed, the database updating means 13a stores the contents of the distributed parameters for the monitoring device to the device database 12a.

After the operator has edited the parameters for the input/output devices, when he or she designates 'Input/Output Device' as the destination of distribution, the distributing means 8 distributes the edited parameters for the input/output device to the controlling device 3. After the parameters for the input/output device have been distributed, the database updating means 13b stores-the contents of the transmitted parameters for the input/output device to the device database 12b.

When fixed information shared in the system is grouped as a common parameter, the place of the parameter in the system can be clarified. Thus, the operator can easily distinguish parameters shared in the system from those discretely used for each device. When parameters shared in the system are changed, the operator can easily know which parameters he or she should change. As a result, input mistakes can be reduced and thereby the system can be effectively operated.

In addition, when the contents of a plurality of TAG databases 11a and 11b are changed, common parameters can be edited and distributed at a time. As a result, the engineering efficiency of the plant can be improved.

In addition, it can be prevented that although the monitoring device 2 and the controlling device 3 are simultaneously used different values are set to the monitoring device 2 and the controlling device 3. Thus, even if a complicated operation such as a change of a system common parameter is performed, the operation can be easily performed.

Furthermore, when information necessary for the monitoring device 2 and information necessary for the controlling device 3 are separately added thereto, information necessary for only the monitoring device 2 can be stored by only the monitoring device 2, whereas information necessary for only the controlling device 3 can be stored by the controlling device 3. Thus, the storage capacity can be reduced.

Moreover, each parameter can be set to each database according to an application. Each parameter can be edited and distributed according to a purpose thereof. As a result, the engineering efficiency of the plant can be improved.

In FIG. 1, after the TAG databases 11a and 11b and the device databases 12a and 12b have been set, the data input/output portion 10 captures data of each portion of the plant through the input/output means 6. Further, the data input/output portion 10 makes reference to the content of the device database 12b and converts the captured plant data into a process value. The converted process value is sent to the monitoring device 2 through the network 4.

In addition, the data input/output portion 10 can make reference to the content of the TAG database 11b and determine whether or not the converted process value is in a valid range. As a result, the data input/output portion 10 can determine a point quality (normal/abnormal of the point state) of the process value. Further, the data input/output portion 10 can compare the converted process value with the limit value to determine an alarm state.

After the monitoring device 2 has received a process value from the controlling device 3, the monitoring portion 9 makes reference to the content of the TAG database 11a to determine the point quality (normal/abnormal of the point state) of the process value and/or the alarm state. Then, the monitoring portion 9 makes reference to the content of the device database 12a to convert the determined result into a display format designated by the operator, and to notify the operator of the determined result through the notifying means 5.

In such a manner, the TAG databases 11a and 11b are disposed in both the controlling device 3 and the monitoring device 2. The monitoring device 2 and the controlling device 3 independently determine a point quality and an alarm state. Thus, even if only a process value is sent from the controlling device 3 to the monitoring device 2, the monitoring device 2 can determine an alarm. As a result, when the monitoring device 2 monitors the plant, the load imposed on the network 4 can be reduced.

Next, with reference to the accompanying drawings, a plant monitoring apparatus according to a second embodiment of the present invention will be described.

In the plant monitoring apparatus 1 shown in FIG. 1, since common parameters between the controlling device 3 and the monitoring device 2 have been set to the TAG databases 11a and 11b, a resultant determination of a point quality, an alarm state, and so forth by the controlling device 3 must match those by the monitoring device 2.

However, it takes a time for a process value to be sent from the controlling device 3 to the monitoring device 2. Thus, the current process value of the controlling device 3 may not match the current process value of the monitoring device 2. Consequently, when a point quality, an alarm state, and so forth are determined according to the current process values in the monitoring device 2 and in the controlling device 3, the determined results may be different. Thus, the data cannot be consistent between the monitoring device 2 and the controlling device 3.

To solve such a problem, according to the second embodiment of the present invention, a current process value, a point quality thereof and/or an alarm state, and so forth are packaged. The packaged data is treated as one unit of data.

Figure 4:
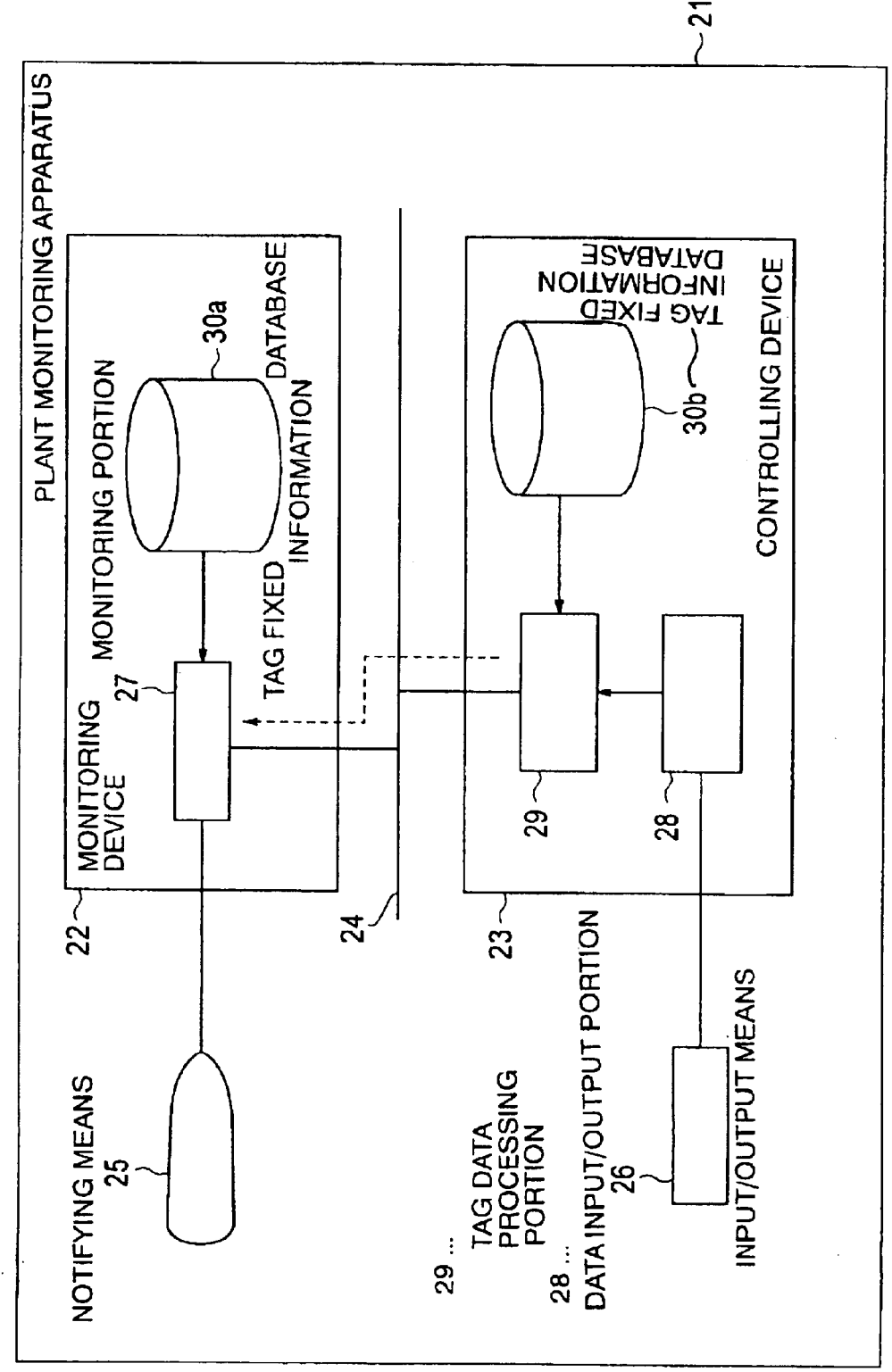
FIG. 4 is a block diagram showing the structure of a plant monitoring apparatus according to a second embodiment of the present invention.

FIG. 4 is a block diagram showing the structure of a plant monitoring apparatus according to the second embodiment of the present invention.

In FIG. 4, a plant monitoring apparatus 21 which monitors a plant comprises a monitoring device 22, a controlling device 23, a network 24, a notifying means 25, and an input/output means 26. The monitoring device 22 has a man-machine interface function with which the user interactively operates the plant. The controlling device 23 exchanges data with the plant. The network 24 connects the monitoring device 22 with the controlling device 23. The notifying means 25 notifies the operator of a message. The input/output means 26 inputs and outputs data to and from the plant.

The monitoring device 22 is provided with a monitoring portion 27 which monitors the plant according to plant information sent from the controlling device 23. The controlling device 23 is provided with a data input/output portion 28 and a TAG data processing portion 29. The data input/output portion 28 sends data captured from the plant to the TAG data processing portion 29. The TAG data processing portion 29 collects process data, which is input from the plant, as TAG variable data at each sampling interval and creates meaningful monitor information for each input point according to each TAGID as an unit. TAG fixed information databases 30a and 30b are disposed in the monitoring device 22 and the controlling device 23, respectively. The TAG fixed information databases 30a and 30b store fixed parameters of each input point which are shared by the monitoring device 22 and the controlling device 23 according to each TAGID as an unit. For example, a valid range width of a process value, the presence or absence of an alarm process, an indispensable limit value in the case that the alarm process is present, and so forth for can be set to the TAG fixed information databases 30a and 30b according to each TAGID as an unit.

In the plant monitoring apparatus 21, the data input/output portion 28 collects process data which are output according to each point from each sensor of each portion of the plant through the input/output means 26 at each sampling interval. Then, a process value and a point state (input point state) are obtained from the process data. The TAG data processing portion 29 is notified of the process value and the point state (input point state). Process data which are input according to each point from the plant includes an analog point and a contact point. An analog point is composed of a process value (analog value) and a point quality (normal/abnormal of point state). A contact point is composed of a process value (contact STE) and a point quality (normal/abnormal of point state).

After the TAG data processing portion 29 has been notified by the data input/output portion 28 of a process value and a point state (input point state), the TAG data processing portion 29 obtains the collection result including the process value, the point state, and the alarm state (normal/alarm) according to the content of the TAG fixed information database 30b. After the collection result has been obtained, the TAG data processing portion 29 groups the collection result including the point state (normal/abnormal), the process value, and the alarm state (normal/alarm) as a current state for each point and notifies the monitoring device 22 of the grouped data as TAG current data. After the monitoring device 22 has been notified of the TAG current data, the monitoring portion 27 notifies the notifying means 25 of the alarm state and so forth contained in the TAG current data to inform the operator of occurrence of a defect of the plant.

Here, after the monitoring device 22 has been notified of the TAG current data, the monitoring portion 27 can also make reference to the content of the TAG fixed information database 30a to determine an alarm.

However, since a process value collected by the controlling device 23 is transferred along with a point state (normal/abnormal) of the process value and an alarm state (normal/alarm) of the process value, the monitoring device 22 does not need to determine an alarm. As a result, the inconsistence between the alarm determination result of the monitoring device 22 and the alarm determination result of the controlling device 23 can be prevented. Consequently, the consistency between the alarm determination result of the monitoring device 22 and the alarm determination result of the controlling device 23 can be maintained. Accordingly, the reliability of the alarm determination can be improved.

Next, an example of the process data collecting method in the case that a point state has changed will be explained.

Figure 5:
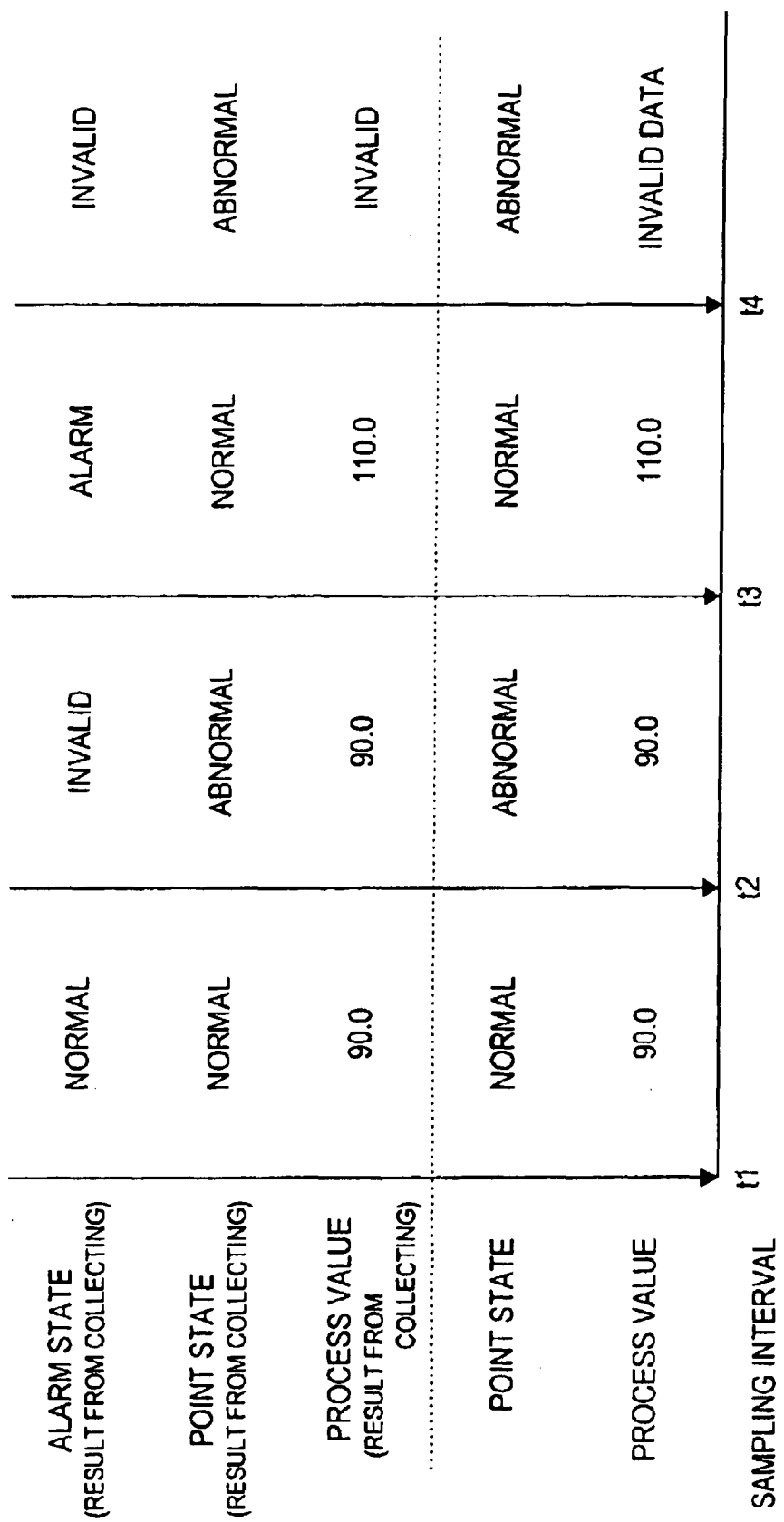
FIG. 5 is a timing chart showing a state transition of process data according to the second embodiment of the present invention.

FIG. 5 is a timing chart showing a state transition of process data according to the second embodiment of the present invention. Now, it is assumed that upper limit value=100.0 for determining an alarm state of a process value has been set to the TAG fixed information database 30b.

It is assumed that at time t1 data of process value=90.0 and point state=normal has been sampled. In this case, since the point state is normal, the TAG data processing portion 29 treats the process value as valid data. As a result, the TAG data processing portion 29 determines that the collection result of the point state should be normal and that the collection result of the process value should be 90.0. Since process value=90.0 does not exceed the limit value, the TAG data processing portion 29 determines that the collection result of the alarm state should be normal.

Next, it is assumed that at time t2 data of process value=90.0 and point state=abnormal has been sampled. In this case, since the process value is normal but the point state is abnormal, the TAG data processing portion 29 determines that the collection result of the point state should be abnormal, that the collection result of the process value should be invalid, and that the collection result of the alarm state should be invalid.

Next, it is assumed that at time t3 data of process value=110.0 and point state=normal has been sampled. In this case, since the point state is normal, the TAG data processing portion 29 determines that the process value should be valid, that the collection result of the point state should be normal, and that the collection result of the process value should be 110.0. In addition, since process value=110.0 exceeds the upper limit value, the TAG data processing portion 29 determines that the collection result of the alarm state should be alarm.

Next, it is assumed that at time t4 data of process value=invalid and point state=abnormal has been sampled. In this case, since the point state is abnormal, the TAG data processing portion 29 determines that the collection result of the point state should be abnormal, that the collection result of the process value should be invalid, and that the collection result of the alarm state should be invalid.

After the collection results including the process value, the point state, and the alarm state have been obtained at each sampling interval, the TAG data processing portion 29 groups the collection results and sends the grouped data as one piece of data to the monitoring device 22.

When a process value, a point quality, and the result of an alarm process are asynchronously sent to the monitoring device 22, in spite of the abnormality of the point the process value or an alarm may be displayed. For example, when only a process value is sent to the monitoring device 22 at time t2 shown in FIG. 5, the monitoring device 22 determines that process value=90 and alarm state=normal although the process value and the alarm state should be treated as an invalid value and an invalid state because the point state is abnormal. Thus, the operator will be informed of incorrect information.

To prevent such a problem, collection results including a process value, a point state, and an alarm state are sent as one piece of data to the monitoring device 22. As a result, the determination results of the monitoring device 22 and the controlling device 23 can be consistent.

Figure 6:
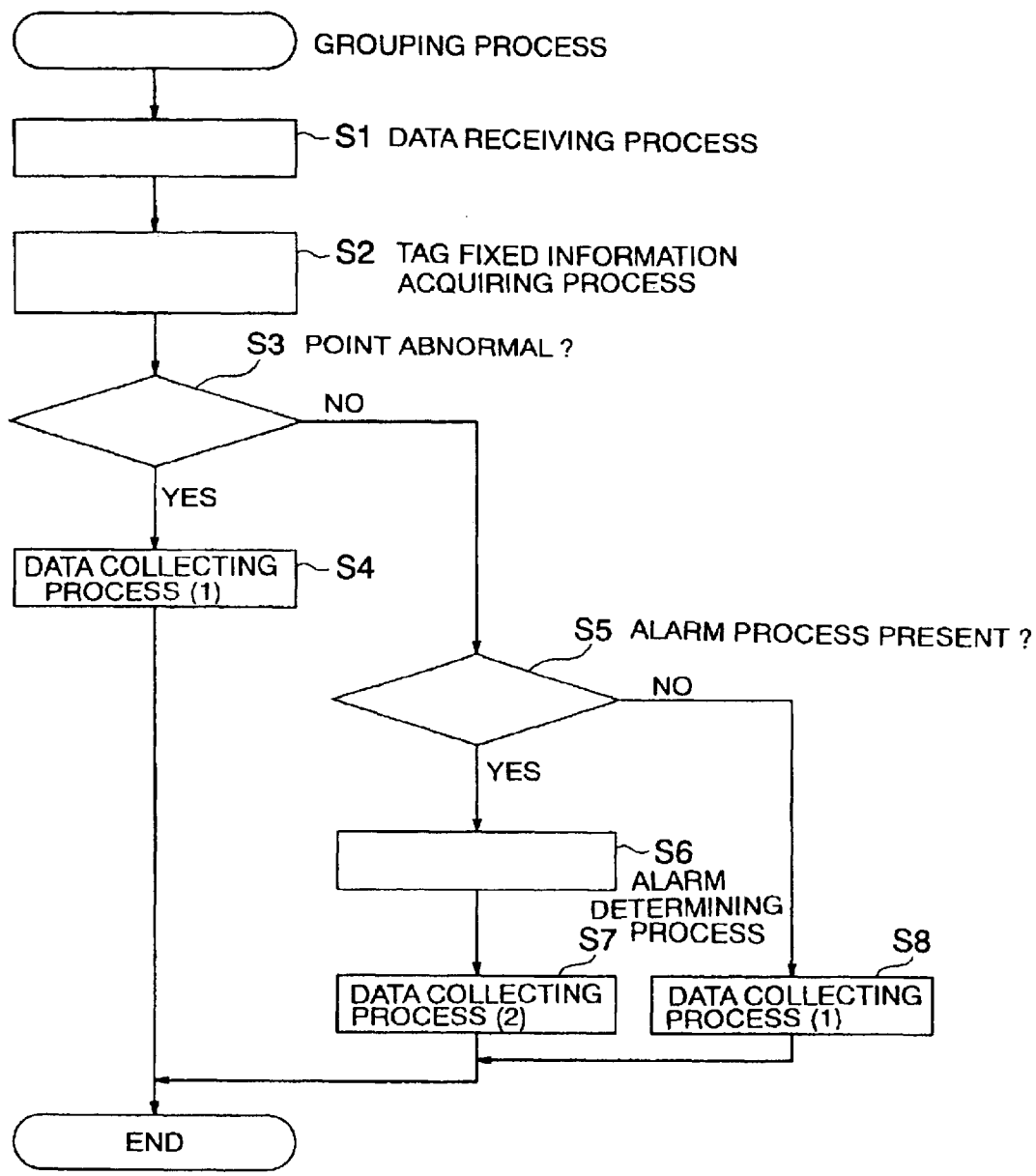
FIG. 6 is a flow chart showing a grouping process of process data according to the second embodiment of the present invention.

FIG. 6 is a flow chart showing a grouping process for process data according to the second embodiment of the present invention. In FIG. 6, when process data is input to the TAG data processing portion 29 through the data input/output portion 28, the TAG data processing portion 29 performs a data receiving process (at step S1). In the data receiving process, the TAG data processing portion 29 makes reference to the content of the TAG fixed information database 30b to determine whether or not the current process value is in the valid range, and to determine a point quality (normal/abnormal of point state).

Next, the TAG data processing portion 29 performs a TAG fixed information acquiring process (at step S2). In the TAG fixed information acquiring process, the TAG data processing portion 29 acquires the presence/absence of the alarm process from the TAG fixed information database 30b. When the alarm process is present, the TAG data processing portion 29 also acquires a limit value.

Next, the TAG data processing portion 29 determines whether or not the point state is abnormal (at step S3). When the point state is abnormal, the TAG data processing portion 29 performs a data collecting process (1) (at step S4). In the data collecting process (1), the TAG data processing portion 29 adds the current process value and point quality to the TAG fixed information to create TAG current data.

In contrast, when the determination result at step S3 represents that the point state is not abnormal, the TAG data processing portion 29 determines whether or not the alarm process is present (at step S5). When the alarm process is present, the TAG data processing portion 29 performs an alarm determining process (at step S6). Thereafter, the TAG data processing portion 29 performs a data collecting process (2) (at step S7). In the data collecting process, the TAG data processing portion 29 compares the current process value with the limit value so as to determine an alarm state. In the data collecting process (2), the TAG data processing portion 29 adds the current process value, the point quality, and the alarm state to the TAG fixed information to create TAG current data.

In contrast, when the determination result at step S5 represents that the alarm process is absent, the TAG data processing portion 29 performs the forgoing data collecting process (1) (at step S8).

As mentioned above, the TAG data processing portion 29, which groups input point data such process values and input point states which are input from the plant as meaningful data and treats the grouped data as TAG current data, is disposed. The TAG data processing portion 29 performs the data collecting process for each point (input point), manages the collected data as TAG current data, and supplies the TAG current data to the monitoring portion 27. As a result, the consistency between each piece of data to be monitored can be improved. Consequently, the monitor performance can be improved.

Next, with reference to the accompanying drawings, a plant monitoring apparatus according to a third embodiment of the present invention will be described.

The plant monitoring apparatus 21 shown in FIG. 4 groups information of a current process value, a point quality thereof, an alarm state thereof, and so forth and transfers the grouped data as one piece of TAG current data. Thus, the consistency of data between the controlling device 23 and the monitoring device 22 can be improved.

However, since various information together with a process value and a point quality have been added to the TAG current data, the amount of information of the TAG current data is larger than that of the case that the process value, the point quality, and so forth are separately handled. Thus, when a current process value collected at each sampling is transferred as TAG current data, the load imposed on the network 24 becomes large.

Thus, according to the third embodiment of the present invention, a state change of TAG current data is monitored. Only when the state of the TAG current data has changed, the TAG current data is transferred. As a result, the load imposed on the network 24 can be reduced.

Figure 7:
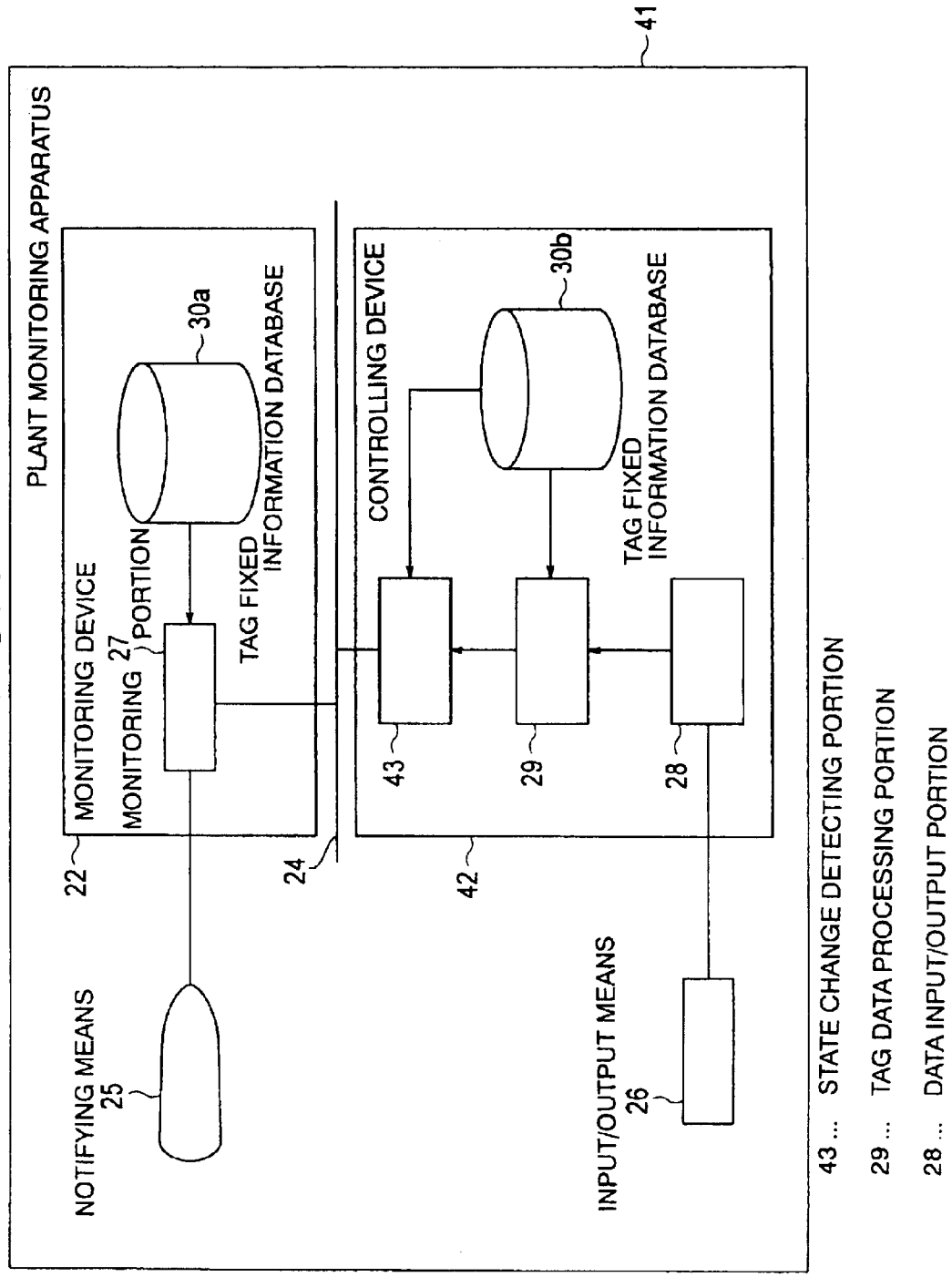
FIG. 7 is a block diagram showing the structure of a plant monitoring apparatus according to a third embodiment of the present invention.

FIG. 7 is a block diagram showing the structure of a plant monitoring apparatus according to the third embodiment of the present invention. In FIG. 7, a plant monitoring apparatus 41 is composed of a state change detecting portion 43 together with the structure of the plant monitoring apparatus 21 shown in FIG. 4. The state change detecting portion 43 detects a state change of TAG current data and determines, according to the state change, whether to notify the monitoring device 22 of the TAG current data.

Specifically, when the state change detecting portion 43 is notified of the TAG current data created by the TAG data processing portion 29, the state change detecting portion 43 stores the TAG current data. The state change detecting portion 43 compares the TAG current data of the latest notification with the TAG current data of the previous notification. Only when the result from comparing represents that one of the following conditions (a) to (c) has been satisfied, the state change detecting portion 43 notifies the monitoring device 22 of the TAG current data of the latest notification through the network 24. In addition, the state change detecting portion 43 stores the TAG current data of the latest notification as the TAG current data of the previous notification.

(a) if a change of a point state has been detected (namely, the point state has been changed from normal to abnormal or from abnormal to normal), (b) if a change of an alarm state has been detected (namely, the alarm state has been changed from normal to alarm or from alarm to normal), and (c) if a point state is normal and a process value has changed for a predetermined value (a mask value for a change amount of a process value) or more (in other words, absolute value of change amount>predetermined value).

The predetermined value may be pre-stored in the TAG fixed information database 30b.

In contrast, if any one of (a) to (c) has not been satisfied, the state change detecting portion 43 discards the TAG current data of the latest notification. In other words, the state change detecting portion 43 does not notify the monitoring device 22 of the TAG current data of the latest notification. In addition, the state change detecting portion 43 does not store the TAG current data of the latest notification as the TAG current data of the previous notification.

Next, a concrete example of the process of the state change detecting portion 43 will be explained.

Figure 8:
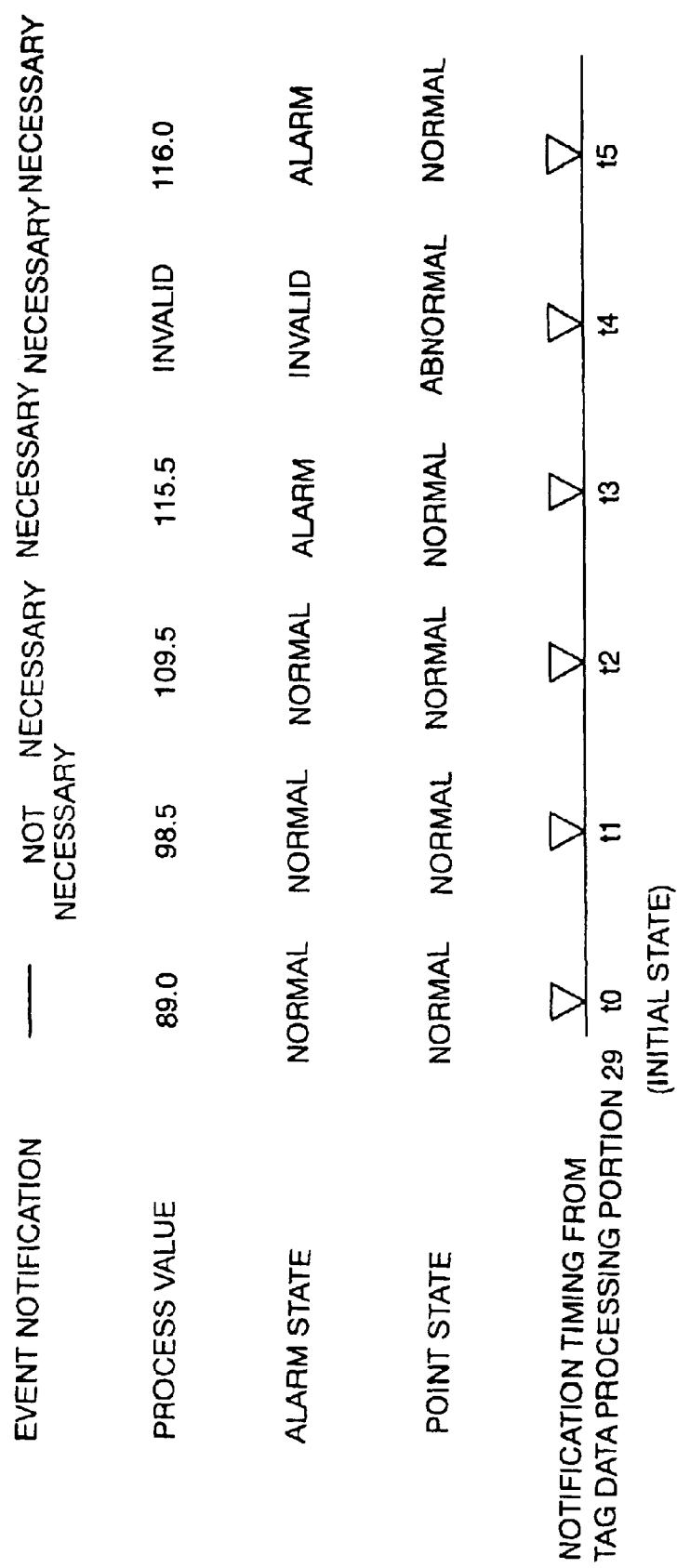
FIG. 8 is a timing chart for explaining a determining method of an event notification according to the third embodiment of the present invention.

FIG. 8 is a timing chart for explaining an event notification determining method according to the third embodiment of the present invention. In this example, it is assumed that the TAG data processing portion 29 notifies the state change detecting portion 43 of a process value, an alarm state, and a point state as TAG current data at each of sampling timings t0, t1, t2, . . . . It is further assumed that timing t0 is an initial state and that the predetermined value is 10.0.

At timing to process value=89.0, alarm state=normal, and point state=normal. The state change detecting portion 43 stores these data.

Next, at timing t1 process value=98.5, alarm state= normal, and point state=normal. The state change detecting portion 43 compares the process value, the alarm state, and the point state at timing t0 with the process value, the alarm state, and the point state at timing t1, respectively. In this case, the alarm state and the point state have not changed. The process value has changed for 98.5−89.0=9.5. Thus, the change amount of the process value is smaller than the predetermined value 10.0. Therefore, the state change detecting portion 43 does not notify the monitoring device 22 of an event. In addition, the state change detecting portion 43 maintains the data at timing t0 as the TAG current data of the previous notification.

As mentioned above, even if a process value has changed, when the change amount of the process value does not exceed the predetermined value, an event notification is not performed. Consequently, also in the case that a process value is displayed on real time basis, the displayed value can be prevented from fluctuating due to a delicate change of the process value. As a result, the monitor performance can be improved, and the load imposed on the network 24 can be reduced.

Next, at timing t2 process value=109.5, alarm state= normal, and point state=normal. The state change detecting portion 43 compares the process value, the alarm state, and the point state at timing t0 with the process value, the alarm state, and the point state at timing t2, respectively. In this case, the alarm state and the point state have not changed. On the other hand, the process value has changed for 109.5−89.0=20.5, which is larger than the predetermined value 10.0. Thus, the state change detecting portion 43 notifies the monitoring device 22 of an event. In addition, the state change detecting portion 43 stores the data at timing t2 as the TAG current data of the previous notification.

Next, at time t3 process value=115.5, alarm state=alarm, and point state=normal. The state change detecting portion 43 compares the process value, the alarm state, and the point state at timing t2 with the process value, the alarm state, and the point state at timing t3, respectively. In this case, the point state has not changed. The process r value has changed for 115.5−109.5=6.0, which is smaller than the predetermined value 10.0. On the other hand, the alarm state has changed from normal to alarm. Thus, the state change detecting portion 43 notifies the monitoring device 22 of an event. In addition, the state change detecting portion 43 stores data at timing t3 as the TAG current data of the previous notification.

Next, at timing t4 process value=invalid, alarm state= invalid, and point state=abnormal. The state change detecting portion 43 compares the process value, the alarm state, and the point state at timing t3 with the process value, the alarm state, and the point state at timing t4, respectively. In this case, the point state has changed from normal to abnormal. Thus, the state change detecting portion 43 notifies the monitoring device 22 of an event. In addition, the state change detecting portion 43 stores the data at timing t4 as the TAG current data of the previous notification.

Next, at timing t5 process value=116.0, alarm state= invalid, and point state=abnormal. The state change detecting portion 43 compares the process value, the alarm state, and the point state at timing t4 with the process value, the alarm state, and the point state at timing t5. In this case, the point state has changed from abnormal to normal. Thus, the state change detecting portion 43 notifies the monitoring device 22 of an event. In addition, the state change detecting portion 43 stores the data at timing t5 as the TAG current data of the previous notification.

Figure 9:
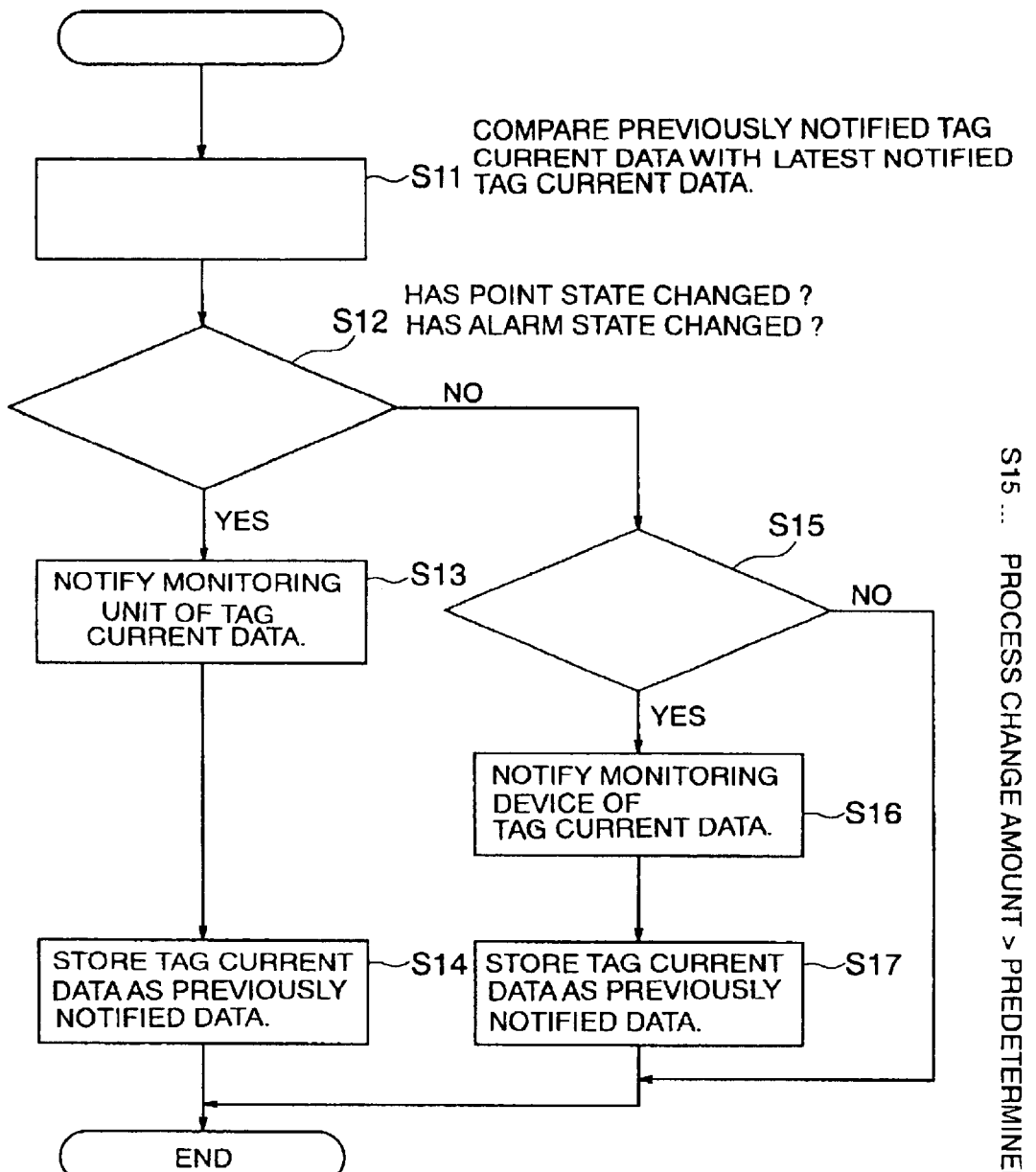
FIG. 9 is a flow chart showing a state change detecting process for process data according to the third embodiment of the present invention.

FIG. 9 is a flow chart showing a detecting process of a state change of process data according to the third embodiment of the present invention. In FIG. 9, the state change detecting portion 43 compares the TAG current data of the latest notification with the TAG current data of the previous notification (at step s11), and determines whether or not the point state has changed and whether or not the alarm state has changed (at step S12). When the results from determining represent that the point state has changed or that the alarm state has changed, the state change detecting portion 43 notifies the monitoring device 22 of the TAG current data of the latest notification through the network 24 (at step S13). In addition, the state change detecting portion 43 stores the TAG current data of the latest notification as the TAG current data of the previous notification (at step S14).

In contrast, when the results from determining at step S12 represent that the point state has not changed and that the alarm state has not changed, the state change detecting portion 43 determines whether or not the process value has changed for the predetermined value or more (at step S15). When the process value has changed for the predetermined value or more, the state change detecting portion 43 notifies the monitoring device 22 of the TAG current data of the latest notification through the network 24 (at step S16). In addition, the state change detecting portion 43 stores the TAG current data of the latest notification as the TAG current data of the previous notification (at step S17).

In contrast, when the result from determining at step S15 represents that the process value has not changed for the predetermined value or more, the state change detecting portion 43 does not notify the monitoring device 22 of the TAG current data of the latest notification, nor does the state change detecting portion 43 store the TAG current data of the latest notification as the TAG current data of the previous notification.

As mentioned above, the state change detecting portion 43 determines whether or not to require an event notification at each sampling timing. Only when the state change detecting portion 43 has detected a state change of the TAG current data, the state change detecting portion 43 notifies the monitoring device 22 of an event through the network 24. As a result, the load imposed on the network 24 can be suppressed without a deterioration of the monitoring function of the monitoring device 22. Consequently, the plant can be monitored on real time basis.

Next, with reference to the accompanying drawings, a plant monitoring apparatus according to a fourth embodiment of the present invention will be explained.

In the plant monitoring apparatus 41 shown in FIG. 7, only when a state has changed, TAG current data is transferred to the monitoring device 22. Thus, the load imposed on the network 24 can be suppressed without a deterioration of the monitoring function of the monitoring device 22.

Here, when TCP/IP (Transmission Control Protocol/Internet protocol) is used as a communication protocol, it can be determined whether or not data has been reached to a remote party. Consequently, a data communication with high reliability can be performed.

Although TCP/IP allows data to be communicated with high reliability, the data transmission rate is low. When TAG current data is transferred to many destinations, the real time performance for monitoring the plant may be sacrificed.

Thus, when TAG current data is transferred to many destinations, it is preferred to use UDP/IP (User Datagram Protocol/Internet Protocol) which has a higher transfer rate than TCP/IP.

However, when UDP/IP is used, although higher data transfer rate is accomplished, it cannot be determined whether or not data has been reached to a remote party. Thus, the reliability of data transfer becomes low.

To solve such a problem, according to the fourth embodiment of the present invention, a count value is added to TAG current data. The resultant TAG current data is transferred to a remote party. According to the count value, the remote party can determine whether or not an event notification has been lost. Consequently, the data transfer rate can be improved without a sacrifice of the reliability of the data transfer.

Figure 10:
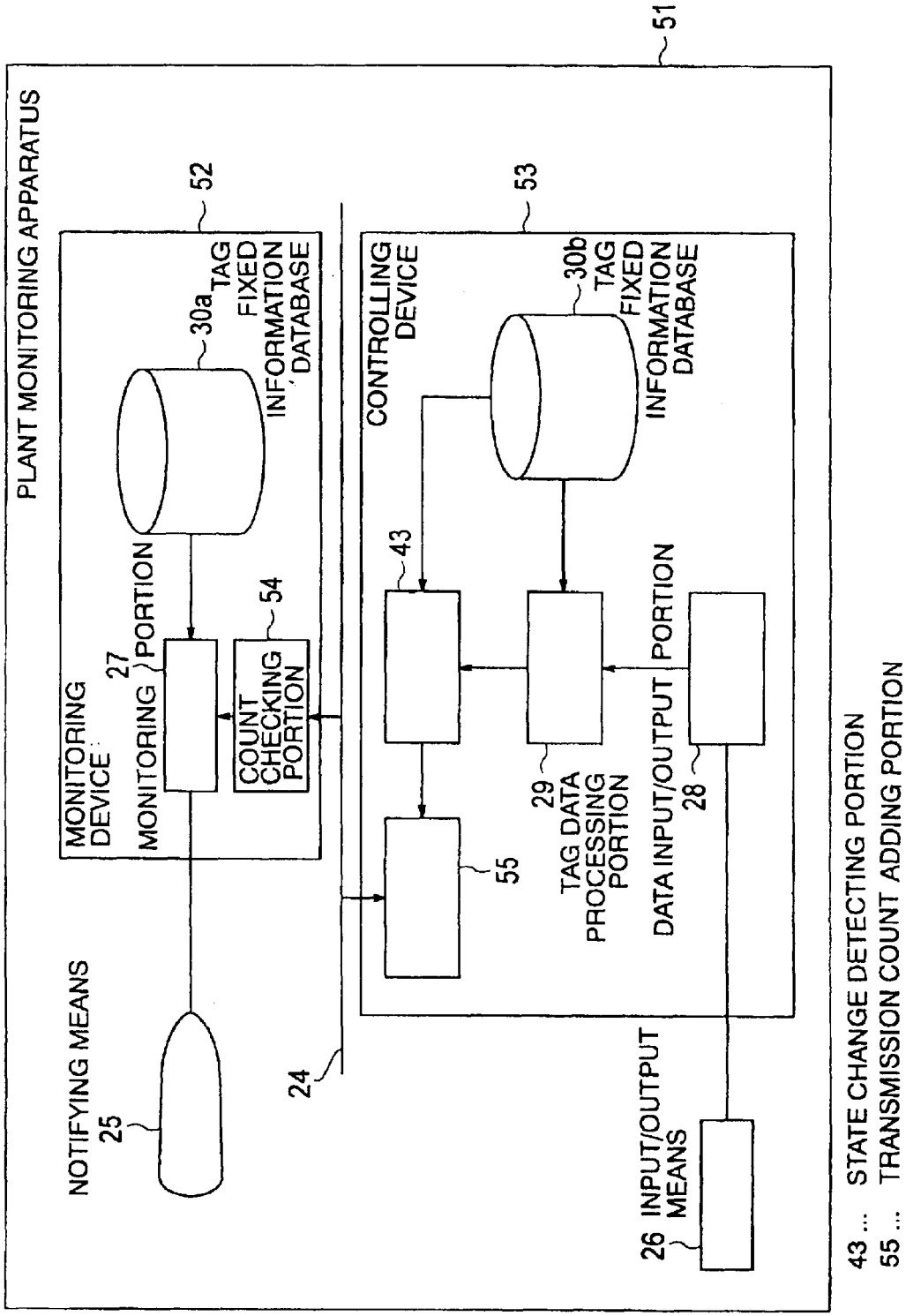
FIG. 10 is a block diagram showing the structure of a plant monitoring apparatus according to a fourth embodiment of the present invention.

FIG. 10 is a block diagram showing the structure of the plant monitoring apparatus according to the fourth embodiment of the present invention. In FIG. 10, a plant monitoring apparatus 51 is composed of the structure of the plant monitoring apparatus 41 shown in FIG. 7, a transmission count adding portion 55 which is disposed in a controlling device 53, and a count checking portion 54 which is disposed in a monitoring device 52. The transmission count adding portion 55 adds a transmission count value to a header portion of TAG current data and notifies the monitoring device 52 of the count value through the network 24. The count checking portion 54 makes reference to the header portion of the TAG current data received through the network 24, checks the transmission count value added to the header portion, and detects whether or not an event notification has been lost due to a network defect.

Specifically, when the count checking portion 54 is initially operated, it requests the transmission count adding portion 55 to set a counter initial value to 0. When the transmission count adding portion 55 is requested to set the counter initial value to 0, whenever the transmission count adding portion 55 is notified by a state change detecting portion 43 that a state has changed, the transmission count adding portion 55 increments the count value by 1, and sets the count value to the header portion of the TAG current data. Thereafter, the transmission count adding portion 55 notifies the count checking portion 54 of TAG current data to whose header portion the count value has been set.

When the count checking portion 54 receives the TAG current data to which the count value has been set, the count checking portion 54 makes reference to the header portion of the TAG current data and acquires the count value which has been set to the TAG current data. The count checking portion 54 compares the count value which has been set to the TAG current data of the latest notification with the count value which has been set to the TAG current data of the previous notification. When the difference of the count values is not +1, the count checking portion 54 determines that an event notification has been lost and notifies the operator that an event notification has been lost through the monitoring portion 27.

Next, a concrete example of processes between the transmission count adding portion 55 and the count checking portion 54 will be explained.

Figure 11:
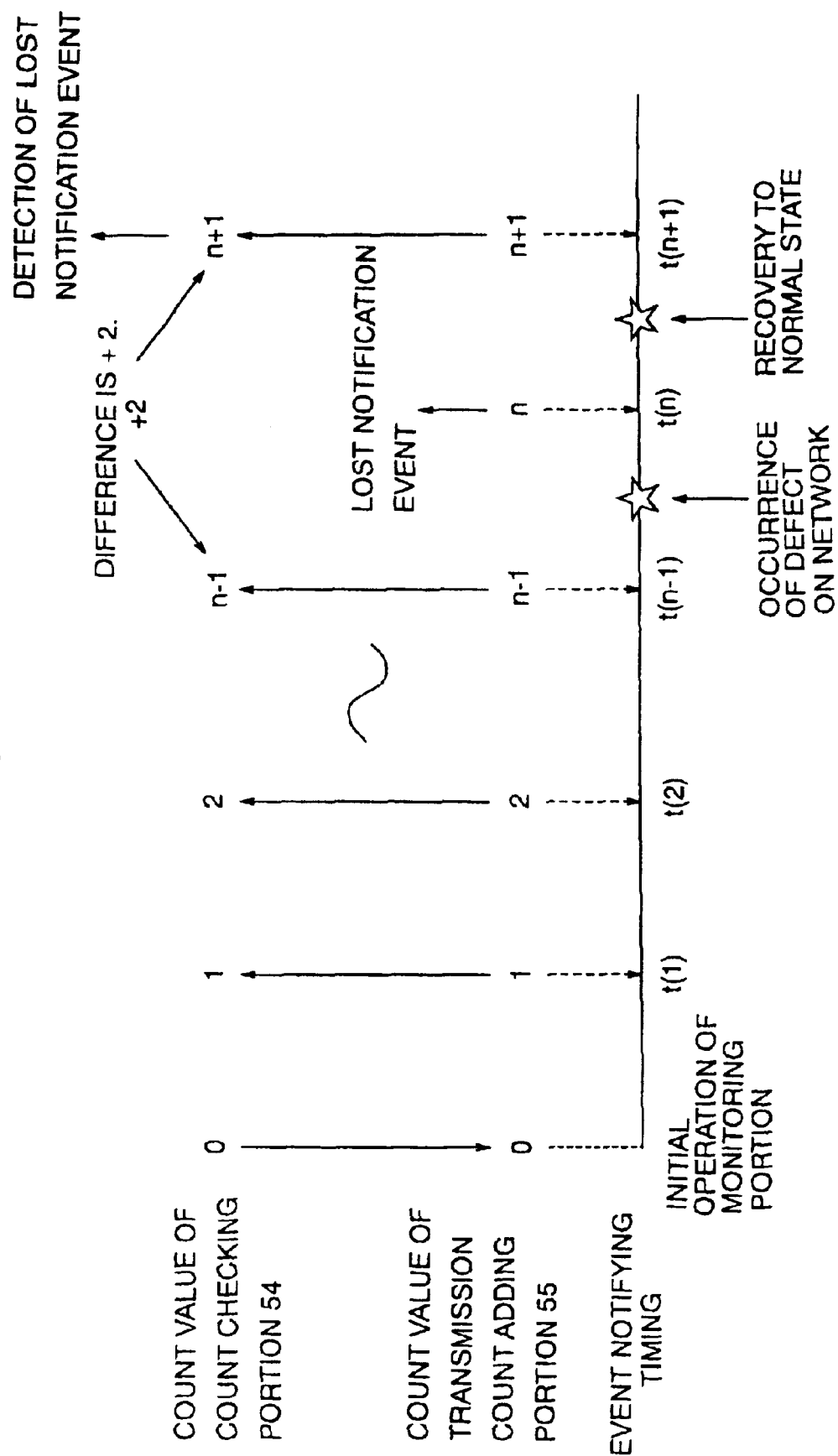
FIG. 11 is a timing chart for explaining a detecting method of a lost event notification according to the fourth embodiment of the present invention.

FIG. 11 is a timing chart for explaining a lost event notification detecting method according to the fourth embodiment of the present invention. In FIG. 11, when the monitoring portion 27 is initially operated, the transmission count adding portion 55 is notified by the count checking portion 54 of an initial count value 0. The transmission count adding portion 55 sets count value=0.

Next, when the transmission count adding portion 55 is notified by the state change detecting portion 43 that a state has changed at time t(1), the transmission count adding portion 55 increments the current count value=0 by 1, adds count value=1 to TAG current data, and notifies the count checking portion 54 of count value=1. When the count checking portion 54 receives the TAG current data, the count checking portion 54 extracts the current count value=1 from the TAG current data and compares the previous count value=0 with the current count value=1. When the result from comparing represents that the difference of the count values is 1, the count checking portion 54 determines that data should have been normally transferred.

Next, when the transmission count adding portion 55 is notified by the state change detecting portion 43 that a state has changed at time t(2), the transmission count adding portion 55 increments the current count value=1 by 1, adds count value=2 to the TAG current data, and notifies the count checking portion 54 of count value=2. When the count checking portion 54 receives the TAG current data, the count checking portion 54 extracts the current count value=2 from the TAG current data and compares the previous count value=1 with the current count value=2. When the result from comparing represents that the difference between the count values is 1, the count checking portion 54 determines that data should have been correctly transferred.

Next, when the transmission count adding portion 55 is notified by the state change detecting portion 43 that a state has changed at time t(n−1), the transmission count adding portion 55 increments the current count value=n−2 by 1, adds count value=n−1 to the TAG current data, and notifies the count checking portion 54 of count value=n−1. When the count checking portion 54 receives the TAG current data, the count checking portion 54 extracts current count value=n−1 from the TAG current data and compares the previous count value=n−2 with the current count value=n−1. When the result from comparing represents that the difference of the count values is 1, the count checking portion 54 determines that data should have been correctly transferred.

Next, when the transmission count adding portion 55 is notified by state change detecting portion 43 that a state has changed at time t(n), the transmission count adding portion 55 increments the current count value=1-by 1, adds count value=n to the TAG current data, and notifies the count checking portion 54 of count value=n.

When it is assumed that a defect takes place on the network 24 after time t(n−1), the count checking portion 54 is not notified of an event at time t(n).

Next, when the transmission count adding portion 55 is notified by the state change detecting portion 43 that a state has changed at time t(n+1), the transmission count adding portion 55 increments the current count value=n by 1, adds count value=n+1 to the TAG current data, and notifies the count checking portion 54 of count value=n+1.

When it is assumed that the defect which had taken place on the network 24 at time t(n−1) or later has recovered at time t(n) or later, an event notification is transferred to the count checking portion 54 at time t(n+1).

When the count checking portion 54 is notified of the event, the count checking portion 54 extracts the current count value=n+1 from the TAG current data and compares the previous count value with the current count value. In this case, since the event at time t(n) has not been transferred to the count checking portion 54 due to the defect on the network 24, the previous count value stored in the count checking portion 54 is still n−1.

Thus, when the count checking portion 54 compares the previous count value=n−1 with the current count value=n+1, the count checking portion 54 detects that the difference between the count values is 2. When the result from detecting represents that difference=2, the count checking portion 54 determines that an event notification should have been lost. The count checking portion 54 notifies the operator of the result from detecting through the notifying means 25.

As mentioned above, when TAG current data is transmitted upon occurrence of an event, the count value is counted up and the resultant count value is added to a header portion of the transmission data. The resultant data is transmitted. The reception side checks the count value. At that time, in the case that the transmission data cannot be received due to any defect and the transmission side has incremented the count value by one, the count values received on the reception side are not successive. As a result, the reception side can detect lost event notifications. Consequently, the reliability of the monitoring function can be improved.

Next, with reference to the accompanying drawings, a plant monitoring apparatus according to a fifth embodiment of the present invention will be explained.

In the plant monitoring apparatus 51 shown in FIG. 10, a count value is added to TAG current data and the resultant TAG current data is transmitted. The reception side checks the count value. Thus, even when for example UDP/IP as a protocol is used, the data transmission rate can be improved while the reliability of data transmission is prevented from being deteriorated.

However, in the case only that a lost event notification is detected on the reception side, the event notification is not transferred to the reception side. Thus, the reliability of the monitoring operation is deteriorated.

To solve such a problem, according to the fifth embodiment of the present invention, when the reception side detects a lost event notification, the reception side requests the transmission side to retransmit the event notification. Thus, even when a defect temporarily takes place on the network, the reliability of the monitoring operation can be improved.

Figure 12:
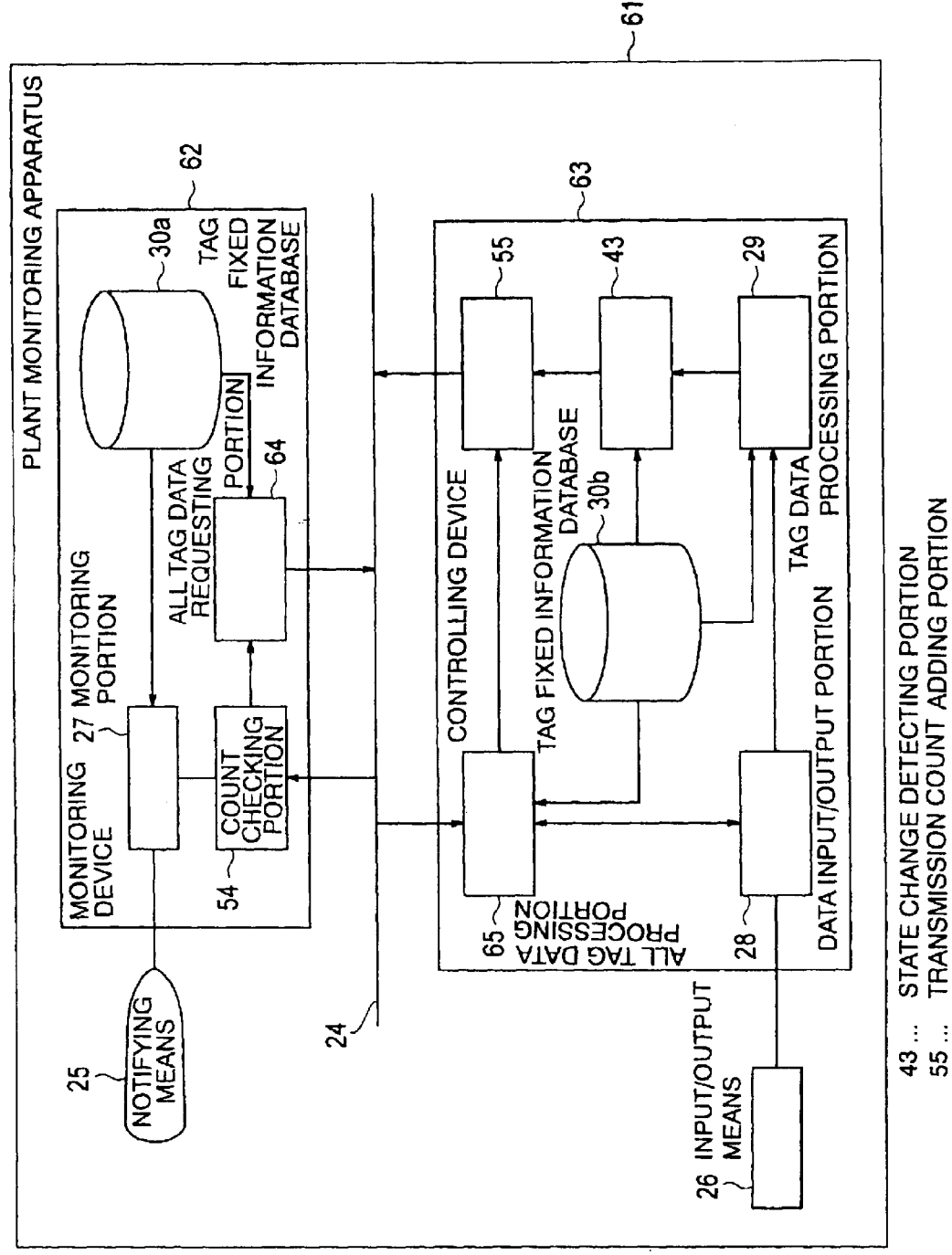
FIG. 12 is a block diagram showing the structure of a plant monitoring apparatus according to a fifth embodiment of the present invention.

FIG. 12 is a block diagram showing the structure of the plant monitoring apparatus according to the fifth embodiment of the present invention. In FIG. 12, a plant monitoring apparatus 61 is composed of the structure of the plant monitoring apparatus 51 shown in FIG. 10, an all TAG data processing portion 65 which is disposed in a controlling device 63, and an all TAG data requesting portion 64 which is disposed in a monitoring device 62. The all TAG data processing portion 65 acquires current data of all input points through the data input/output portion 28 according to a request from the all TAG data requesting portion 64. Thus, making reference to the content of the TAG fixed information database 30b, the all TAG data processing portion 65 converts the current data of all the input points into TAG data. When a lost event notification has been detected, the all TAG data requesting portion 64 requests the all TAG data processing portion 65 for current data of all TAGs.

When the count checking portion 54 detects a lost event according to the result from comparing count values, the count checking portion 54 notifies the all TAG data requesting portion 64 that an event notification has been lost. Then, being notified that the event notification has been lost, the all TAG data requesting portion 64 requests the all TAG data processing portion 65 for data of all the TAGs.

When the all TAG data processing portion 65 is requested for data of all the TAGs, the all TAG data processing portion 65 acquires current process data of all the TAGs and distributes TAG current data of all the TAGs to the monitoring portion 27 through the transmission count adding portion 55 and the count checking portion 54.

Figure 13:
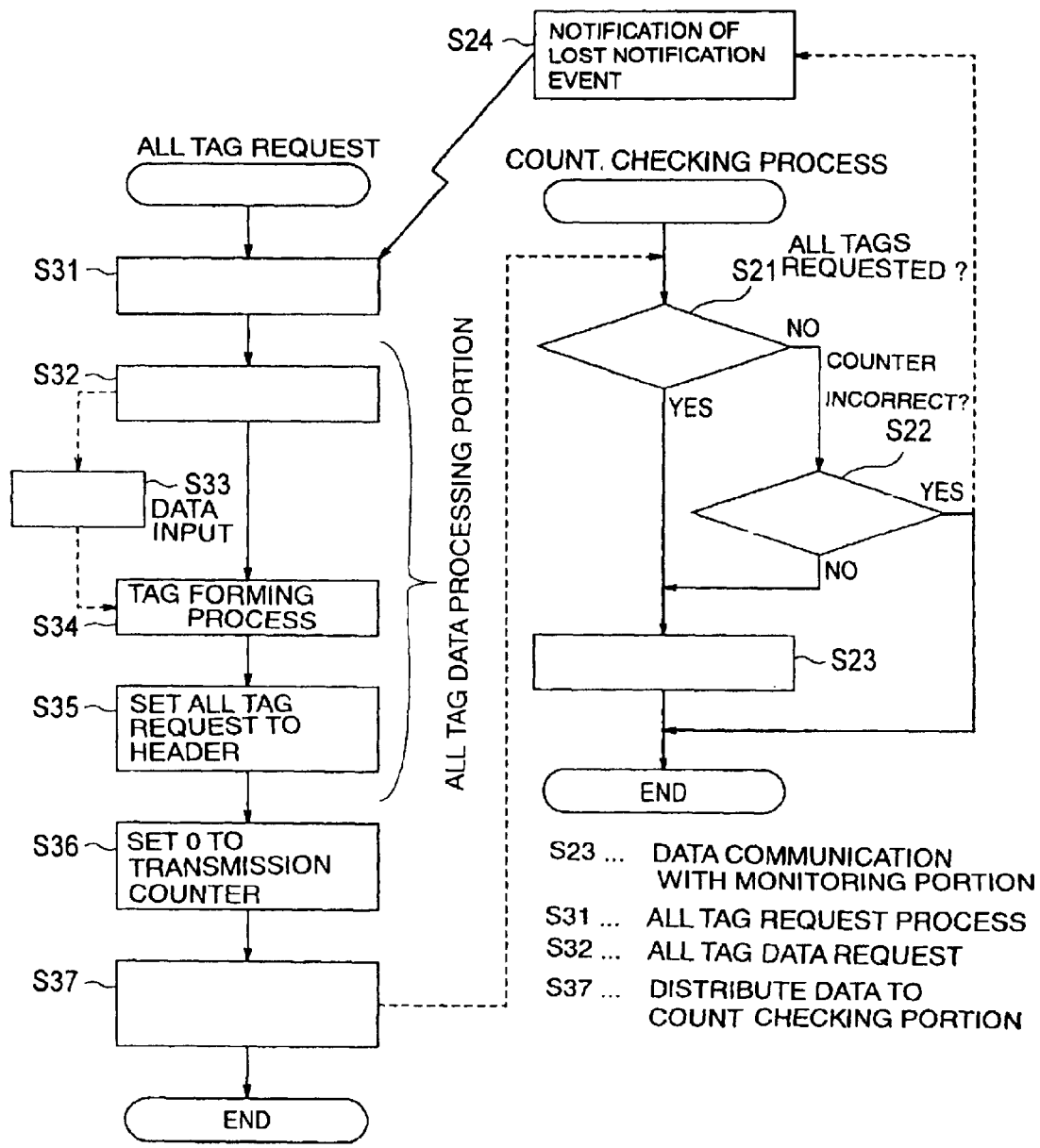
FIG. 13 is a flow chart for showing a data acquiring method upon detection of a lost event notification according to the fifth embodiment of the present invention.

FIG. 13 is a flow chart showing a data acquiring method in the case that a lost event notification is detected according to the fifth embodiment of the present invention. In FIG. 13, when the count checking portion 54 receives TAG current data through the network 24, the count checking portion 54 determines whether or not all TAG data is requested according to the content of the transmission header of the TAG current data (at step S21). When the result from determining represents that all TAG data is not requested, the count checking portion 54 checks a transmission count value of the TAG current data received from the transmission count adding portion 55 and determines whether or not an event notification has been lost (at step S22). When the result from determining represents that an event notification has been lost, the count checking portion 54 notifies the all TAG data requesting portion 64 that an event notification has been lost (at step S24). When the all TAG data requesting portion 64 is notified by the count checking portion 54 that an event notification has been lost, the all TAG data requesting portion 64 requests the all TAG data processing portion 65 for all TAG data (at step S31).

When the all TAG data processing portion 65 is requested by the all TAG data requesting portion 64 for all TAG data, the all TAG data processing portion 65 searches the TAG fixed information database 30b for all TAGs which corresponds to the request (at step S32). After having searched for all TAGs which corresponds to the request, the all TAG data processing portion 65 inputs data through the data input/output portion 28 according to the result from searching (at step S33) and creates TAG current data for all the TAGs corresponding to the request as all TAG data (at step S34).

Thereafter, the all TAG data processing portion 65 adds header data representing a reply to the request for all TAG data to the all TAG data (at step S35) and notifies the transmission count adding portion 55 of the all TAG data to which the header data has been added.

When receiving the all TAG data, the transmission count adding portion 55 sets an initial value 0 as a transmission counter (at step S36) and adds transmission counter=0 to the all the TAG data. Thus, the transmission count adding portion 55 distributes the all TAG data to which transmission counter=0 has been added to the count checking portion 54 through the network 24 (at step S37).

When receiving transmission data from the controlling device 63, the count checking portion 54 determines whether or not the transmission data is a reply containing the result corresponding to the request for all TAG data according to the header data of the transmission data (at step S21). When the result from determining presents that the transmission data is a reply containing the result corresponding to the request for all TAG data, the count checking portion 54 notifies the monitoring portion 27 of the all TAG data as the latest data without need to compare the transmission count=0 which has been set to the all TAG data with the previous count value (at step S23).

When receiving the all TAG data from the count checking portion 54, if necessary, the monitoring portion 27 selects data to be used and notifies the operator of the selected data through the notifying means 25.

As mentioned above, the all TAG data requesting portion 64 and the all TAG data processing portion 65 are disposed. When a lost event notification is detected, the all TAG data requesting portion 64 requests the all TAG data processing portion 65 to acquire states of all TAGs. Thus, the all TAG data processing portion 65 notifies the monitoring portion 27 of all the TAG current data. When a defect temporarily takes place on the network 24 and a lost event notification corresponding to a state change at each input point is detected, current data of all TAGs is acquired and treated as monitor data. As a result, the reliability of the monitoring function can be improved.

Figure 14:
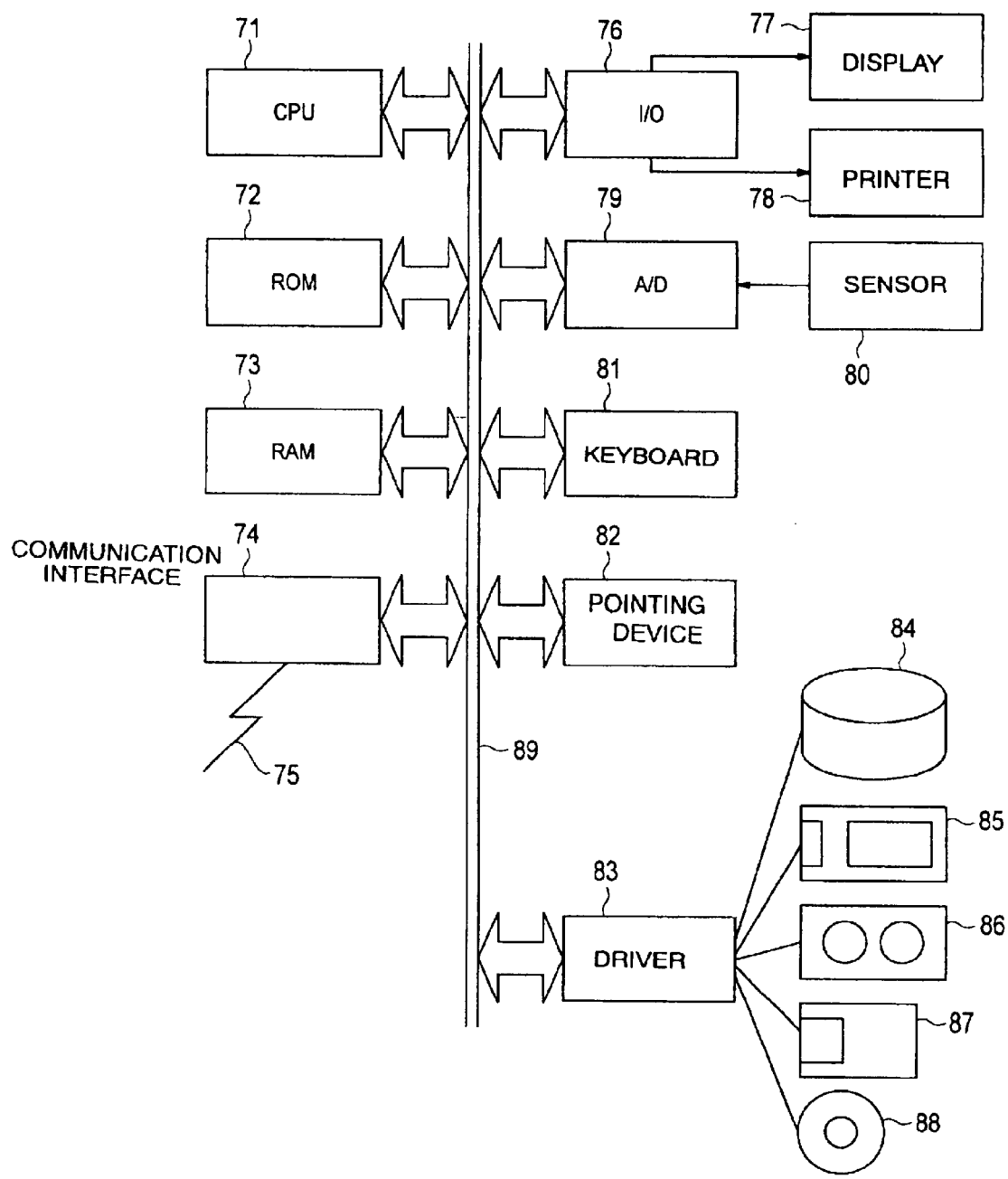
FIG. 14 is a block diagram showing a structure on which software that accomplishes a plant monitoring apparatus according to an embodiment of the present invention acts.

FIG. 14 is a block diagram showing a structure on which software that accomplishes a plant monitoring apparatus according to an embodiment of the present invention acts.

In FIG. 14, reference numeral 71 represents a central processing unit (CPU) which performs an overall process. Reference numeral 72 represents a read-only memory (ROM). Reference numeral 73 represents a random access memory (RAM). Reference numeral 74 represents a communication interface. Reference numeral 75 represents a communication network. Reference numeral 76 represents an input/output interface. Reference numeral 77 represents a display which displays a monitor screen, an operation screen, alarm information, a plant video input, and so forth. Reference numeral 78 represents a printer which prints monitor information, operation information, and so forth. Reference numeral 79 represents a sensor which detects a process signal and reads video data and so forth. Reference numeral 80 represents an A/D conversion processing device which converts an analog signal which is read by the sensor 79 into a digital signal. Reference numeral 81 represents a keyboard. Reference numeral 82 represents a pointing device such as a mouse. Reference numeral 83 represents a driver which drives a storage medium. Reference numeral 84 represents a hard disk. Reference numeral 85 represents an IC memory card. Reference numeral 86 represents a magnetic tape. Reference numeral 87 represents a floppy disk. Reference numeral 88 represents an optical disc such as a CD-ROM or a DVD-ROM. Reference numeral 89 represents a bus.

A program executing editing and distributing common parameters, a program executing a TAG forming process, a program executing detecting a state change pertaining to a process, a program executing detecting a lost event notification according to a count value, a program executing retransmitting an event notification, common parameters, device parameters, TAG fixed information, and so forth are stored in the storage medium such as the hard disk 84, the IC memory card 85, the magnetic tape 86, the floppy disk 87, and/or the optical disc 88.

When these programs and data are read out to the RAM 73 from the storage mediums, the plant can be distributively monitored on real time basis while data at each monitoring point is consistent. In addition, the load imposed on the communication network 75 can be suppressed from being increased.

In addition, the program executing editing and distributing common parameters, the program executing the TAG forming process, the program executing detecting a state change pertaining to a process, the program executing detecting a lost event notification according to a count value, the program executing retransmitting an event notification, the common parameters, the device parameters, the TAG fixed information and/or so forth may be retrieved from the communication network 75 through the communication interface 74.

As the communication network 75 connected to the communication interface 74, for example, LAN (Local Area Network), WAN (Wide Area Network), the Internet, an analog telephone network, a digital telephone network (ISDN: Integral Services Digital Network), PHS (Personal Handy System), or a wireless communication network such as a satellite communication can be used.

When the program executing editing and distributing common parameters is started, the CPU 71 makes the display 77 display the edit screen for common parameters. When a common parameter is set on the edit screen by operating the keyboard 81, the pointing device 82, or the like, the common parameter is distributed to each device through the communication network 75.

When the program executing the TAG forming process is started, the CPU 71 collects a process value at each sampling timing through the sensor 79. With reference to TAG fixed information stored in the storage medium such as the hard disk 84, the IC memory card 85, the magnetic tape 86, the floppy disk 87, or the optical disc 88, the CPU 71 groups a process value and information associated therewith at each sampling timing and distributes the grouped data through the communication network 75.

When the program executing detecting a state change pertaining to a process is started, the CPU 71 compares past TAG formed data with current TAG formed data to detect a state change pertaining to a process. Only when having detected the state change, the CPU 71 distributes the current TAG formed data through the communication network 75.

When the program executing detecting a lost event notification according to a count value is started, the CPU 71 adds a count value representing a transmission count to TAG formed data and transmits the TAG formed data through the communication network 75. When receiving the TAG formed data, the CPU 71 determines whether the count value added to the received TAG formed data matches a reception count of the TAG formed data. When they do not match, the CPU 71 causes a message representing that to be displayed on the display 77.

When the program executing retransmitting an event notification is started, if a count value added to TAG formed data does not match a reception count of the TAG formed data, the CPU 71 requests the transmission side to retransmit the TAG formed data through the communication network 75. On the other hand, when requested to retransmit TAG formed data through the communication network 75, the CPU 71 acquires process data of all input points through the sensor 79, makes reference to TAG fixed information stored in the storage medium such as the hard disk 84, the IC memory card 85, the magnetic tape 86, the floppy disk 87, the optical disc 88, or the like, and generates all TAG data. The CPU 71 distributes the all TAG data to the request side through the communication network 75.

As was described above, according to the present invention, a common parameter for a plurality of devices is distributed to each device. As a result, the common parameter for the plurality of devices can be changed by one edit operation. Thus, it is not necessary to change the common parameter for each device repeatedly. Consequently, the engineering efficiency of the plant can be improved.

In addition, process information is correlated on the side which distributes information. The correlated process information is distributed at a time. Consequently, it is not necessary for the side to which the information is distributed to correlate process information separately transmitted. Accordingly, the process information, which has been distributed to a plurality of locations, can be uniformly correlated. Thus, since the consistency of data between the controlling device and the monitoring device is improved, the reliability of the monitoring operation is also improved.

Industrial Utilization

A plant monitoring apparatus and a storage medium according to the present invention can be produced in a plant production industry, a plant engineering industry, and so forth. Thus, the plant monitoring apparatus and the storage medium according to the present invention can be adopted in those industries or industries that use the plant actually.

What is claimed is:

1. A plant monitoring apparatus configured to input process information from a plant and to monitor the plant, the plant monitoring apparatus comprising;

process information grouping means for grouping the process information according to an identifier unit;

transmitting means for transmitting the grouped process information at a time; and state change detecting means for detecting a state change of the plant according to the identifier unit, wherein the transmitting means is configured to transmit current process information only when the state change of the plant has been detected.

2. The plant monitoring apparatus as set forth in claim 1, further comprising:

means for causing the process information to be consistent according to the identifier unit.

3. The plant monitoring apparatus as set forth in claim 1, wherein the state change detecting means includes change amount detecting means for detecting a change amount of a plant value of the process information according to the identifier unit, and wherein the transmitting means is configured to transmit the current process information only when the change amount exceeds a predetermined value.

4. The plant monitoring apparatus as set forth in claim 1, further comprising:

counting means for counting an event notification transmission count according to the identifier unit, wherein the transmitting means is configured to add the event notification transmission count to an event notification and transmit the event notification to which the event notification transmission count is added.

5. The plant monitoring apparatus as set forth in claim 4, further comprising:

receiving means for receiving the event notification to which the event notification transmission count has been added; and determining means for determining a reception state of the event notification according to a result from comparing the event notification transmission count and an event notification reception count.

6. The plant monitoring apparatus as set forth in claim 5, further comprising:

retransmission requesting means for requesting a retransmission of the event notification according to the reception state.

7. A plant monitoring method configured to input process information from a plant and to monitor the plant, the method comprising:

collecting process information;

grouping the process information according to an identifier unit;

transmitting the grouped process information at a time; and detecting a state change of the plant according to the identifier unit, wherein the transmitting occurs when the state change of the plant has been detected.

8. The plant monitoring method as set forth in claim 7, further wherein the transmitting occurs only when the state change of the plant has been detected.

* * * * *

UNITED STATES PATENT AND TRADEMARK OFFICE
CERTIFICATE OF CORRECTION

PATENT NO. : 6,950,766 B2 Page 1 of 1
APPLICATION NO. : 10/297805
DATED : September 27, 2005
INVENTOR(S) : Okamoto et al.

It is certified that error appears in the above-identified patent and that said Letters Patent is hereby corrected as shown below:

<u>Title page,</u>
Insert Item -- [30] Foreign Application Priority Data
June 13, 2000 (JP) ............ 2000-177258 --.

Signed and Sealed this

Fourth Day of July, 2006

JON W. DUDAS
*Director of the United States Patent and Trademark Office*